United States Patent Office 2,831,861
Patented Apr. 22, 1958

2,831,861
2:2:4-TRIMETHYL-DECAHYDROQUINOLINE NITRITE AND CARBONATE

Bertrand Ernest Wilde, Marchwiel, Wrexham, Wales, assignor to Monsanto Chemicals Limited, London, England, a British company No Drawing. Application October 11, 1954
Serial No. 461,679

Claims priority, application Great Britain
October 14, 1953

3 Claims. (Cl. 260—286)

This invention relates to new chemical compounds which have been found to have various industrial uses, in the processing of rubber and elsewhere.

The new chemical compounds are derivatives of quinoline and in particular of the compound 2:2:4-trimethyl-1:2-dihydroquinoline, which can itself be obtained by condensing acetone and aniline.

It has now been found that 2:2:4-trimethyl-1:2-dihydroquinoline can be reduced by direct hydrogenation to the compound 2:2:4-trimethyl-decahydroquinoline, which has not previously been described. This compound is capable of forming salts, and it has been found that both the compound itself and its salts are of value in special industrial applications.

The new compounds of the invention are accordingly 2:2:4-trimethyl-decahydroquinoline.

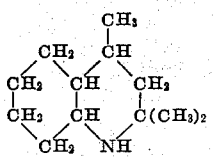

and its salts, for instance the nitrite, carbonate and benzoate.

The new compound 2:2:4-trimethyl-decahydroquinoline has been found to be of particular value as an antioxidant for rubber, especially for use in white and other light-coloured compositions.

It is well known that vulcanised rubber is liable to deteriorate on exposure to the action of heat, light and oxygen-containing gases, and that deterioration occurs in the atmosphere under normal conditions of use. To resist this effect, various substances have been proposed for use in rubber as antioxidants, but many of these suffer from the disadvantage that they cause darkening with time and badly discolour the rubber stocks in which they are incorporated if these should be of a light colour. This problem does not arise with dark-coloured stocks obtained using carbon blacks, for instance, but it is a serious difficulty in such compositions as the white rubber stocks obtained using zinc oxide, titanium dioxide and analogous substances.

The discovery has now been made that 2:2:4-trimethyl-decahydroquinoline is an effective antioxidant for rubber, and moreover that it does not seriously discolour light-coloured rubber stocks, so that by its use the difficulties referred to above can be avoided. It should be mentioned that in determining the effect of rubber antioxidants there are two standard tests, the first being the action of oxygen under pressure on a vulcanised rubber prepared using the antioxidant (the so-called "oxygen bomb test") and the second the behaviour of the sample of vulcanised rubber on heating in a hot air oven (the "hot air oven test"). The antioxidant properties of the above new compound can be demonstrated by both these tests, as is seen from the examples given later in this specification.

The 2:2:4-trimethyl-decahydroquinoline may if desired be used in rubber in conjunction with other antioxidants, and by properly choosing the other antioxidant a good antioxidant effect can be obtained in this way without causing any undue discolouration of light-coloured stocks. Thus a mixture of 2:2:4-trimethyl-decahydroquinoline and a benzyl cresol may sometimes be preferable to the former alone. It is also possible to use the 2:2:4-trimethyl-decahydroquinoline in conjunction with other antioxidants such as a mono-ether of a dihydric phenol or a 2:4:6-trialkyl-phenol.

The benzyl cresols are cresols substituted in the nucleus by one or more benzyl groups, and they can be obtained by treating the cresols with benzylating agents such as benzyl chloride. In practice a suitable benzyl cresol for use in the above manner can be obtained by benzylating a commercial cresol containing a mixture of isomers (a so-called "cresylic acid") by means of benzyl chloride, preferably so as to introduce on an average about one benzyl group into each cresol molecule. The product will of course contain a mixture of monobenzyl isomers, in addition to which a small proportion of molecules will be formed containing more than one benzyl group substituted into the nucleus and there will also be a small measure of reaction between the phenolic group and the benzyl chloride to form a benzyl ether. Furthermore, cresylic acids invariably contain a certain proportion of phenols other than the cresols. However, the product will be essentially a mixture of isomeric benzyl cresols and is eminently suitable for use as an antioxidant. Other compounds similar to the benzyl cresols can be used, for instance benzyl xylenols (and similar benzyl alkyl-phenols) and other benzyl phenols, and these can in general be obtained in an analogous manner.

If a mono-ether of a dihydric phenol is used as a rubber antioxidant in conjunction with a 2:2:4-trimethyl-decahydroquinoline it is preferably the mono-benzyl ether, though other ethers, for instance the mono-ethyl ether, are also suitable. In practice a mono-ether of a commercial mixture of dihydric phenols is best used, especially one containing a preponderance of catechol, and very good results have been obtained using the mono-ethers, particularly the mono-benzyl ether, of a commercial mixture of dihydric phenols containing about 90% by weight of catechol and methyl-substituted catechols. Other commercial mixtures containing more equal proportions of isomeric dihydric phenols can also be used in forming the ether.

If a 2:4:6-trialkyl phenol is used a 2:4-dimethyl-6-octyl phenol (especially one obtained by the reaction of 2:4-dimethyl phenol with diisobutylene) is very satisfactory, and other 2:4:6-trialkyl phenols which can be used are 2:6-dimethyl-4-octyl phenol (again one obtained from the dimethyl phenol and diisobutylene is very suitable) and 2:6-dibutyl-4-methyl phenol, in particular where the butyl group is tertiary butyl. It is, however, not necessary to use a pure 2:4:6-trialkyl phenol in preparing mixtures of the above kind, and for instance an alkylated commercial cresylic acid can be used in admixture with the 2:2:4-trimethyl-decahydroquinoline. Thus an octylated cresylic acid obtained by octylating the acid with diisobutylene can very suitably be used; such an octylated product might contain several isomeric 2:4:6-trialkyl-phenols along with other substances.

Where 2:2:4-trimethyl-decahydroquinoline is used as a rubber antioxidant in admixture with another antioxidant the proportions of the constitutents of such mixtures can lie within wide limits. Good results can be obtained using mixtures containing 2:2:4-trimethyl-decahydroquinoline and a second antioxidant in proportions from 25:75 to 75:25 by weight, and also mixtures outside these limits. Very satisfactory results can be obtained using approximately equal proportions by weight of 2:2:4-trimethyl-decahydroquinoline and a benzyl cresol.

The quantity of the 2:2:4-trimethyl-decahydroquinoline or antioxidant mixture containing it used in the rubber stock will depend upon the circumstances, but will usually be between 0.005 and 5 parts for each 100 parts of rubber, and in most instances between 0.25 and 2 parts. In the examples given later in this specification a quantity of 1 part of antioxidant for each 100 parts of rubber is used, and good results are obtained with the light-coloured stock described. It will be appreciated that the antioxidants of the invention can be used with dark-coloured rubber stocks also, but they are of particular value with light-coloured stocks owing to the limited number of satisfactory antioxidants available which do not discolour such stocks unduly. They are of value both with natural and synthetic rubber.

It will of course be understood that where a mixture of antioxidants is used, the constituents of the mixture may be incorporated in the rubber separately. In general, however, it will be found more convenient to mix the antioxidant constituents together before use.

The salts of 2:2:4-trimethyl-decahydroquinoline can be prepared directly from the base itself, by contacting it with the corresponding acid, or other substance providing the acid radical, and the preparation of the nitrite, carbonate and benzoate is described in the examples given later in this specification.

The salts of 2:2:4-trimethyl-decahydroquinoline, particularly the nitrite and carbonate, are of special use in reducing the tendency of metals to corrode. Thus if the metal object to be protected is placed in an enclosed space together with a quantity of the salt, the vapour formed in the enclosed space has an effect in reducing corrosion of the metal. The salts can therefore be described as anti-corrosives of the "vapour phase inhibitor" type, and they are of particular value where metal objects are to be sealed in packages for transport.

A particularly suitable method of operation in the latter instance is to incorporate the salt in the wrapping material, and where this is an absorbent material such as paper it is then sufficient to treat the wrapping material with an aqueous solution of a suitable water-soluble salt of 2:2:4-trimethyl-decahydroquinoline and dry. A 5% aqueous solution of the nitrite of 2:2:4-trimethyl-decahydroquinoline is very suitable.

The invention is illustrated by the following examples:

EXAMPLE 1

This example describes the preparation of 2:2:4-trimethyl-decahydroquinoline from 2:2:4-trimethyl-1:2-dihydroquinoline, from which it can readily be obtained by hydrogenation under pressure using a nickel catalyst.

The 2:2:4-trimethyl-1:2-dihydroquinoline itself, the condensation product of acetone and aniline, can be obtained by passing acetone vapour into heated aniline in the presence of benzene sulphonic acid, and separating the product by neutralising the reaction mixture and distilling it at reduced pressure.

600 grams of 2:2:4-trimethyl-1:2-dihydroquinoline were introduced into a steel autoclave fitted with a rocker mechanism, and a suspension of 6 grams of Raney nickel catalyst in a small amount of ethyl alcohol was added. The autoclave was closed, and the air contained in it was replaced by passing a stream of hydrogen through the autoclave. The hydrogen pressure in the autoclave was then increased to 750 pounds per square inch, and the contents of the autoclave were heated electrically to a temperature of 200° C., the autoclave being agitated by means of the rocker mechanism. The reaction was then allowed to proceed, the temperature of the reactants being maintained at 200° C. and hydroden under pressure being admitted into the autoclave from time to time in order to maintain the pressure at 750 pounds per square inch.

After 6 hours the amount of hydrogen which had been taken up in the reaction was approximately that required to convert the 2:2:4-trimethyl-1:2-dihydroquinoline to 2:2:4-trimethyl-decahydroquinoline, that is to say 4 molecules of hydrogen for each molecule of the former. The supply of hydrogen was then cut off, the autoclave was allowed to cool to room temperature, and the reaction product was separated from the catalyst by filtration.

The reaction product consisted of 625 grams of a clear colourless liquid which was almost entirely 2:2:4-trimethyl-decahydroquinoline. This could be purified further by distillation, to give a colourless mobile liquid having a boiling point of 232° C. at a pressure of 760 mm. of mercury and a refractive index of 1.4770 at 25° C.

EXAMPLE 2

This example relates to the use as an antioxidant in natural rubber of the reaction product (almost entirely 2:2:4 - trimethyl - decahydroquinoline) obtained as described in Example 1.

A rubber stock of the following composition was compounded on a laboratory mill:

| | Parts by weight |
|---|---|
| Pale crepe rubber | 100 |
| Blanc fixe | 50 |
| Zinc oxide | 5 |
| Titanium dioxide | 5 |
| Stearic acid | 1 |
| Sulphur | 2 |
| Accelerator (tetramethyl thiuram disulphide) | 0.375 |

The stock was first made up without any antioxidant, and then with 1 part by weight of the reaction product of Example 1.

Each of the two stocks was vulcanised at 126° C. for 20 minutes, and the physical properties of the vulcanised rubbers obtained were determined before ageing and:

(a) After ageing for 6 days at 70° C. in an oxygen bomb at a pressure of 300 lbs./sq. inch;

(b) After ageing for 12 days at 70° C. in a hot air oven.

The conditions of British Standard Specification No. 903/1950 were observed.

The following results were obtained:

*Oxygen bomb test*

(i) TENSION STRENGTH

[Kgms./sq. cm.]

| | Original | After 6 days | Percentage of original figure |
|---|---|---|---|
| Stock without antioxidant | 230 | sample melted | |
| Stock with antioxidant | 251 | 149 | 59 |

(ii) PERCENTAGE ELONGATION AT BREAK

| | Original | After 6 days | Percentage of original figure |
|---|---|---|---|
| Stock without antioxidant | 685 | Sample melted | |
| Stock with antioxidant | 665 | 570 | 86 |

(iii) MODULUS AT 500% ELONGATION

[Kgms./sq. cm.]

| | Original | After 6 days | Percentage of original figure |
|---|---|---|---|
| Stock without antioxidant | 98 | Sample melted | |
| Stock with antioxidant | 115 | 110 | 96 |

Hot air oven test

(i) TENSION STRENGTH
[Kgms./sq. cm.]

|  | Original | After 12 days | Percentage of original figure |
|---|---|---|---|
| Stock without antioxidant | 230 | 86 | 37 |
| Stock with antioxidant | 251 | 110 | 44 |

(ii) PERCENTAGE ELONGATION AT BREAK

|  | Original | After 12 days | Percentage of original figure |
|---|---|---|---|
| Stock without antioxidant | 685 | 500 | 73 |
| Stock with antioxidant | 665 | 475 | 71 |

(iii) MODULUS AT 500% ELONGATION
[Kgms./sq. cm.]

|  | Original | After 12 days | Percentage of original figure |
|---|---|---|---|
| Stock without antioxidant | 98 | 90 | 92 |
| Stock with antioxidant | 115 | 120 | 104 |

In order to test any discolouring effect of the antioxidant the two vulcanised stocks were subjected to the action of ultraviolet light for a period of five hours, and their colour at the end of the period was noted, as follows:

Stock without antioxidant___ Exceedingly pale yellow.
Stock with antioxidant_____ Very slightly more yellow.

EXAMPLE 3

The tests carried out in Example 2 were repeated using as antioxidant the same quantity (1 part by weight) of a mixture of equal parts by weight of the reaction product of Example 1 and a benzyl cresol obtained by benzylating a commercial cresylic acid containing about 60% of ortho-cresol, the remainder being largely meta- and para-cresols. It also contained a small proportion of phenol.

The benzyl cresol was prepared as follows. 250 cc. of the cresylic acid in the dry state were placed in a 500 cc. flask fitted with a reflux condenser and heated to 150° C. 50 cc. of benzyl chloride were then added slowly over a period of 30 minutes, during which time the temperature was increased to about 160° C. When all the benzyl chloride had been added the heating was discontinued, and a current of air was blown through the reaction mixture for about 30 minutes to remove residual hydrogen chloride. The product was then fractionally distilled at a pressure of 12 mm. of mercury; unreacted cresylic acid distilled at about 100° C. and the fraction distilling between 190° C. and 250° C. was collected. This was again fractionally distilled at a pressure of 12 mm. of mercury and the fraction distilling between 190° C. and 210° C. collected. This was the benzyl cresol used as antioxidant, consisting essentially of a mixture of mono-benzyl isomers and containing a little benzyl phenol.

The following results were obtained:

Oxygen bomb test
(i) TENSION STRENGTH
[Kgms./sq. cm.]

|  | Original | After 6 days | Percentage of original figure |
|---|---|---|---|
| Stock without antioxidant | 230 | Sample melted | |
| Stock with antioxidant | 237 | 182 | 77 |

(ii) PERCENTAGE ELONGATION AT BREAK

|  | Original | After 6 days | Percentage of original figure |
|---|---|---|---|
| Stock without antioxidant | 685 | Sample melted | |
| Stock with antioxidant | 660 | 570 | 86 |

(iii) MODULUS AT 500% ELONGATION
[Kgms./sq. cm.]

|  | Original | After 6 days | Percentage of original figure |
|---|---|---|---|
| Stock without antioxidant | 98 | Sample melted | |
| Stock with antioxidant | 110 | 125 | 111 |

Hot air oven test
(i) TENSION STRENGTH
[Kgms./sq. cm.]

|  | Original | After 12 days | Percentage of original figure |
|---|---|---|---|
| Stock without antioxidant | 230 | 86 | 37 |
| Stock with antioxidant | 237 | 130 | 55 |

(ii) PERCENTAGE ELONGATION AT BREAK

|  | Original | After 12 days | Percentage of original figure |
|---|---|---|---|
| Stock without antioxidant | 685 | 500 | 73 |
| Stock with antioxidant | 660 | 520 | 79 |

(iii) MODULUS AT 500% ELONGATION
[Kgms./sq. cm.]

|  | Original | After 12 days | Percentage of original figure |
|---|---|---|---|
| Stock without antioxidant | 98 | 90 | 92 |
| Stock with antioxidant | 110 | 117 | 106 |

Once again in order to test any discolouring effect of the antioxidant the two vulcanised stocks were subjected to the action of ultra-violet light for a period of five hours, and their colour at the end of the period was noted, as follows:

Stock without antioxidant_____ Exceedingly pale yellow.
Stock with antioxidant_____ Slightly more yellow, but still very pale.

EXAMPLE 4

This example describes the preparation of the nitrite of 2:2:4-trimethyl-decahydroquinoline.

36.2 grams of 2:2:4-trimethyl-decahydroquinoline were dissolved in a mixture of 300 cc. of acetone and 3.6 cc. of water, and a stream of nitrous fumes (generated by the action of glacial acetic acid on sodium nitrite) was passed into the solution. A precipitate was formed, and when no further precipitation took place the flow of nitrous fumes was stopped and the precipitate filtered off. It was then washed with a little acetone and dried at 60° C.

The product, the nitrite of 2:2:4-trimethyl-decahydroquinoline, was a pale cream-coloured solid.

EXAMPLE 5

This example also describes the preparation of the nitrite of 2:2:4-trimethyl-decahydroquinoline.

Firstly, a solution of the hydrochloride of 2:2:4-trimethyl-decahydroquinoline was prepared by adding 36.2 grams of the amine to a dilute solution of hydrochloric acid which had been made by dissolving 24 grams of the concentrated acid (32% w./w.) in 200 cc. of water.

The hydrochloride solution was then cooled to a temperature of just below 10° C. and a solution of 14.5 grams of sodium nitrite in 50 cc. of water was added slowly with stirring, the temperature of the mixture being maintained as just below 10° C. A precipitate was formed which was collected by filtration, washed with a little water and dried at 60° C.

The product, the nitrite of 2:2:4-trimethyl-decahydroquinoline, was a pale cream-coloured solid.

EXAMPLE 6

This example describes a particularly suitable method of preparing the nitrite of 2:2:4-trimethyl-decahydroquinoline.

To 1,000 cc. of methanol were added 181 grams of 2:2:4-trimethyl-decahydroquinoline, 76 grams of sodium nitrite and 150 cc. of water, and the mixture was stirred until the solid materials had dissolved. A solution of 55 grams of 98% sulphuric acid in 55 cc. of water was then added with stirring to the methanol solution. As a result, sodium sulphate was precipitated and the temperature of the mixture rose to 36° C. The mixture was cooled to 24° C. and was filtered to remove the sodium sulphate which was washed on the filter with 200 cc. of methanol, the washings being added to the main filtrate.

Methanol was then removed from the filtrate by distillation, initially on a water bath at atmospheric pressure and later under reduced pressure; the volume of distillate collected being 1,100 cc. To the cold solid residue remaining after the distillation were added 250 cc. of benzene and the mixture was distilled under reflux in a Dean and Stark apparatus to remove water, the total volume of water collected being 30 cc.

The residual benzene slurry was then cooled to 25° C. and filtered to collect the solid product. The latter was washed with 250 cc. of benzene and dried in warm air to yield 162 grams of the nitrite of 2:2:4-trimethyl-decahydroquinoline, a white solid, M. P. 176–179° C. The yield was 71.6% based on the amount of 2:2:4-trimethyl-decahydroquinoline used as starting material and practically all the unreacted amine was recovered.

EXAMPLE 7

This example describes the preparation of the carbonate of 2:2:4-trimethyl-decahydroquinoline.

36.2 grams of 2:2:4-trimethyl-decahydroquinoline were dissolved in a mixture of 200 cc. of acetone and 3.6 cc. of water. A stream of carbon dioxide was passed through the solution resulting in the formation of a white precipitate. When no more precipitation took place the flow of carbon dioxide was stopped and the precipitate was filtered off, washed with a little acetone and dried at room temperature.

The product was the required carbonate, a white hygroscopic solid.

EXAMPLE 8

This example describes the preparation of the benzoate of 2:2:4-trimethyl-decahydroquinoline.

6.1 grams of benzoic acid were dissolved in a mixture of 200 cc. of petroleum ether of boiling range 40–60° C. and 100 cc. of diethyl ether. The solution was warmed to a temperature of 25° C., and to it was added a solution of 9 grams of 2:2:4-trimethyl-decahydroquinoline in a further 50 cc. of the same petroleum ether. A precipitate was formed, and this was filtered off, washed with a little of the same petroleum ether and dried at 60° C.

The product was a white solid, the required benzoate.

EXAMPLE 9

This example and the next relate to the use of the nitrite of Example 4 as a "vapour phase corrosion inhibitor."

A number of small brown paper bags were thoroughly soaked in a 5% aqueous solution of the nitrite, excess solution was drained off, and the bags were allowed to dry in the air. Small pieces of bright mild steel were placed in the bags, which were then closed with paper clips and stored out of doors so as to be freely exposed to the atmosphere, though shielded from direct rainfall. A similar series of pieces of bright mild steel were stored in the same way in bags which had not been treated with the 2:2:4-trimethyl-decahydroquinoline nitrite.

After two weeks of storage under these conditions the steel pieces in the untreated bags had rusted badly, but those in the treated bags were still bright and unaffected by rust.

EXAMPLE 10

50 cc. of a 2% aqueous solution of 2:2:4-trimethyl-decahydroquinoline nitrite were placed in each of a number of boiling tubes, and in each tube a strip of bright mild steel (specially prepared by abrading with emery paper and degreasing in warm benzene) was suspended in such a way as to avoid condensed water vapour trickling on to it from the boiling tube or the suspending hook. A similar series of boiling tubes provided with bright mild steel strips and containing 50 cc. of water instead of the nitrite solution were prepared as a control. The tubes were maintained for 14 days in a thermostat at 30° C. and the mouths of the tubes were opened for a short time on alternate days to allow the escape of moisture vapour.

After 14 days all the steel strips in the control tubes containing water alone were found to be heavily rusted, whereas the strips suspended over the 2:2:4-trimethyl-decahydroquinoline nitrite solution showed only a slight discolouration.

EXAMPLE 11

The tests described in Example 10 were repeated using this time a 2% aqueous solution of 2:2:4-trimethyl-decahydroquinoline carbonate.

After 14 days test it was found that all the steel strips in the control tubes containing water alone were heavily rusted, whereas the strips suspended over the 2:2:4-trimethyl-decahydroquinoline carbonate solution were only slightly discoloured.

What is claimed is:

1. A compound selected from the class consisting of 2:2:4-trimethyl-decahydroquinoline nitrite and 2:2:4-trimethyl-decahydroquinoline carbonate.
2. 2:2:4-trimethyl-decahydroquinoline nitrite.
3. 2:2:4-trimethyl-decahydroquinoline carbonate.

References Cited in the file of this patent

UNITED STATES PATENTS

| Number | Name | Date |
|---|---|---|
| 2,203,899 | Dunbrook et al. | June 11, 1940 |
| 2,251,992 | Dickey et al. | Aug. 12, 1941 |
| 2,290,561 | Ingram | July 24, 1942 |
| 2,514,658 | Kehe | July 11, 1950 |
| 2,582,192 | Denison | Jan. 8, 1952 |
| 2,643,176 | Wachter et al. | June 23, 1953 |
| 2,653,854 | Schaar | Sept. 29, 1953 |

OTHER REFERENCES

Braun et al.: Berichte, 1924, vol. 57, p. 388.

Beilstein, Hand. Org. Chem., vol. XX, 2nd suppl. (1953), p. 79 citing Yamaguchi et al., J. Pharm. Soc. Japan (1926), No. 533, S. 54.